(12) United States Patent
Millwee (10) Patent No.: US 7,979,908 B2
(45) Date of Patent: Jul. 12, 2011

(54) METHOD AND SYSTEM OF VERIFYING AND AUTHENTICATING BACKGROUND AND CONSUMER RECORDS

(75) Inventor: Steven C. Millwee, Lutz, FL (US)

(73) Assignee: SecureTest Inc., Athens, GA (US)

( * ) Notice: Subject to any disclaimer, the term of this patent is extended or adjusted under 35 U.S.C. 154(b) by 1259 days.

(21) Appl. No.: 11/351,968

(22) Filed: Feb. 10, 2006

(65) Prior Publication Data

US 2006/0184395 A1   Aug. 17, 2006

Related U.S. Application Data

(60) Provisional application No. 60/593,769, filed on Feb. 11, 2005.

(51) Int. Cl.
*G06F 7/04* (2006.01)
*H04L 29/06* (2006.01)

(52) U.S. Cl. .............................. 726/26; 713/166; 726/30

(58) Field of Classification Search .................. 709/225, 709/229; 713/168–174, 182–186, 166; 726/28–30, 726/8, 21, 26; 380/233
See application file for complete search history.

(56) References Cited

U.S. PATENT DOCUMENTS

| | | | | |
|---|---|---|---|---|
| 2002/0116634 A1* | 8/2002 | Okubo | ........................... | 713/200 |
| 2003/0154406 A1* | 8/2003 | Honarvar et al. | ............ | 713/201 |
| 2004/0088173 A1* | 5/2004 | Mather | ............................. | 705/1 |
| 2004/0111359 A1* | 6/2004 | Hudock | ........................... | 705/38 |
| 2005/0055231 A1* | 3/2005 | Lee | ..................................... | 705/1 |
| 2006/0018520 A1* | 1/2006 | Holloran | ....................... | 382/116 |

FOREIGN PATENT DOCUMENTS

WO   WO 0133421 A1 *   5/2001
WO   WO 03071443 A1 *   8/2003

OTHER PUBLICATIONS

"Repair your own credit", 3rd Edition, Bob Hammond, ISBN 1-56414-517-4.*
"Repair your own credit", 3rd Edition, Bob Hammond, ISBN 1-56414-517-4, Pub. Year: 2001.*

* cited by examiner

*Primary Examiner* — Taghi T Arani
*Assistant Examiner* — Mohammad L Rahman
(74) *Attorney, Agent, or Firm* — Smith Risley; Steven P. Wigmore (57) ABSTRACT

A method and system of verifying and authenticating the accuracy of public or private background reports. These reports contain information about consumers, such as aggregated data about criminal history, security clearance qualifications, security access authorization, credit, insurance and medical claims, and other public and private information wherein applicants, employees, individuals, credit reporting agencies, background screening entities, and consumers self-authenticate the accuracy of the records. The consumer report and a self-authentication questionnaire is delivered to the consumer by hand, email, facsimile, securely online, mail, overnight express, courier, or other delivery means, which is returned by similar methods with the completed questionnaire.

20 Claims, 6 Drawing Sheets

VERIFICATION REQUIRED
COPY MUST BE GIVE BY EMPLOYER TO APPLICANT/EMPLOYEE

Date: 02-03-2006
Social Security #: 999999999
DOB: 07111959
STI Account #: STITEST
Employer: SECURTEST INC
Subject: John Doe

SOCIAL SECURITY TRACE

THE SOCIAL SECURITY NUMBER IS VALID AND WAS ISSUED IN FLORIDA. THIS SEARCH DOES NOT VALIDATE THE SUBJECT'S NAME OR IDENTITY TO THIS SOCIAL SECURITY NUMBER. YOU SHOULD ALWAYS VERIFY IDENTITY AND SOCIAL SECURITY NUMBER ACCORDING TO I-9 REGULATIONS.

UNITED STATES TERRORIST WATCH LIST SEARCH

---

This applicant's name is not on the current terrorist watch list.

Provide the applicant the instructions along with this history report. YOU SHOULD HAVE THE APPLICANT OR EMPLOYEE PRESENT WHEN YOU VIEW THIS REPORT TO EXPEDITE THE AUTHENTICATION OF THE RECORD. You can have the applicant complete the verification and authentication online or obtain the faxable version. A copy follows the end of this report.

NOTICE TO APPLICANT

Text

FIG. 4

All information must be completed.

What is the Report # on page 1 of the report:

What is the name of the employer or prospective employer requesting the report?

Your eMail:

Your Phone #:

All information must be completed.

Your First Name

Your Middle Name

Your Last Name

Your Social Security Number

Your Date of Birth (mm/dd/yyyy)

Your Home Street Address

City

State

ZIP Code

Check the box for your answer

A. Did you authorize this report? ☐ Yes ☐ No
1. Is the criminal history report your criminal history? ☐ Yes ☐ No ☐ Some of it is
2. Is this criminal history report accurate? ☐ Yes ☐ No ☐ Some of it is

FIG. 5

3. I have criminal convictions that are not on this report. ☐ Yes ☐ No
4. I have been convicted of a misdemeanor involving violence. ☐ Yes ☐ No
5. I have been convicted of a felony involving violence. ☐ Yes ☐ No
6. I have been convicted of a felony in the last 7 years. ☐ Yes ☐ No
7. I am on probation or parole. ☐ Yes ☐ No
8. If an applicant for employment, I no longer wish to be considered for employment and withdraw my employment application. ☐ Yes ☐ No
9. I should be considered for employment despite my criminal record. ☐ Yes ☐ No
10. I did not disclose a criminal conviction on the employment application. ☐ Yes ☐ No
11. Please explain why the employer should consider your employment application (or employment status if already employed by the employer) and what you have done to better yourself despite your past record. Type/Print in detail your answer.

12. Describe which records by date and case # if listed ARE NOT yours. (We search county state and federal courts to verify records that you say are not yours. Untruthfulness is grounds for not being hired or terminated. Type/Print in detail your answer.

I have carefully reviewed this information and certify that it is true and correct. By clicking on Submit-Finished, I hereby indemnify and forever hold harmless searching entity, its strategic partners and my prospective or current employer from any and all claims arising out of my validating this information with my answers. My answers will become part of my record to help clarify, correct or validate my biographical information which is exclusively owned by searching entity.

Signature if mailing or faxing or otherwise type your full name in box.

FIG. 5 (cont'd)

METHOD AND SYSTEM OF VERIFYING AND AUTHENTICATING BACKGROUND AND CONSUMER RECORDS

CROSS-REFERENCE

This is a utility application of provisional application Ser. No. 60/593769, filed Feb. 11, 2005.

BACKGROUND OF THE INVENTION

1. Field of Invention:

A method for verifying and authenticating public and private consumer records about consumers, applicants, employees, individuals, and organizations based on a system of self-reporting verification and subsequent reinvestigation or validation of the information contained in consumer reports.

2. Description of the Prior Art:

There are numerous data bases available to acquire and verify personal information for numerous reasons such as individuals seeking or continuing employment, financial transactions such as loans and other selection or qualifying processes.

Unfortunately, information obtained from various data bases is often incomplete or inaccurate. This can result in wrongfully denying an applicant or individual an opportunity he or she might otherwise be eligible for. If an individual were permitted to review the information prior to a decision being made based upon the erroneous information, the deficiency could generally be rectified. Moreover, when the information is derogatory, individuals may not be afforded the opportunity to explain or mitigate the negative information.

Thus, there is a need for a method or system that provides a means for an individual to review, verify, authenticate and explain data or information obtained on his or her personal history that may impact on the decision making process.

SUMMARY OF THE INVENTION

The present invention relates to a Method and System of verifying and authenticating background records, such as those found in consumer, credit, criminal, security clearance, security access, insurance, medical, and background reports or records derived from public and private sources, databases, criminal courts, and law enforcement. Records are commonly based on court records, public and private databases containing information about consumers' credit, criminal, security clearance, security access authorization, insurance, medical, and background history, among others.

The subject invention provides a mode to authenticate and verify applicant, employee, or consumer information such as criminal records, credit reports, security clearances or access, medical records, insurance claims history, and other personal and public information using a self-reporting questionnaire based system that allows a subject to verify his or her information through a series of authentication and verification questions.

The system may use remote computers operatively coupled or linked to at least one data base provider by corresponding data communication links capable of transferring data and information therebetween.

The method and system for verifying and authenticating personal history data of a subject obtained from a data base provider requested by a third party comprises authorizing the third party to conduct a personal history data base search of the subject from the data base provider, requesting the personal history data of the subject from the data base provider, searching the data base of the data base provider for the personal history data of the subject, transmitting the personal history data of the subject to the requesting third party, providing the subject with the received personal history data for examination and verification, verifying and authenticating the personal history data by the subject and reviewing the authenticated personal history data by the third party.

The invention accordingly comprises the features of construction, combination of elements, and arrangement of parts, which will be exemplified in the construction hereinafter set forth, and the scope of the invention will be indicated in the claims.

BRIEF DESCRIPTION OF DRAWINGS

For a fuller understanding of the nature and object of the invention, reference should be had to the following detailed description taken in connection with the accompanying drawings in which.

DETAILED DESCRIPTION OF THE INVENTION

The present invention relates to a method and system of verifying and authenticating personal and public information of an individual or subject obtain from public and private records, such as criminal history records, credit reports, security clearances, medical claims history, workers compensation claims, injury claims, insurance claims, and consumer reports, among others.

The system provides a mode to authenticate and verify applicant, employee, consumer, or individual (hereafter "subject") information (hereafter "consumer report", "record", or "report", such as found in criminal history records, credit reports, security clearances, permissible security access, medical claims or records history, workers compensation claims, injury claims, insurance claims, and consumer reports. The invention is a self-reporting questionnaire based system that permits an individual to verify the accuracy of his or her consumer or background report through a series of authentication and verification biographical based questions. These reports and authentication questionnaires are delivered to and returned by the consumer or applicant using various means, such as hand, email, facsimile, securely online, email, mail, overnight express, courier, or other delivery methods. A process of self-reporting and authenticating adverse or derogatory information uncovered during a background or consumer investigation that provides open transparency between the consumer and user of these records. Records are aggregated from public and private sources often collected by Credit Reporting Agencies (CRA) found in court files and records, law enforcement records, employment history records, public and private databases, and other sources and delivered to consumers, employees, vendors, vendor employees, federal contractors, military bases, government facilities, credit providers, financial institutions, employers, applicants for employment, and others. By self-authentication of the information by the consumer saves valuable time, costs and legal liabilities associated with a delay in reinvestigating the accuracy or authenticity of the records by contacting the original sources or repositories of the records. The authenticated records and rehabilitative efforts undertaken by the consumer, job candidate, or individual are transmitted to the user of the reports (employers, prospective employers, organization, government entities, and others) by hand, email, facsimile, securely online, mail, overnight express, courier, or other delivery methods. The authenticated report helps users of reports make improved decisions, including hiring, retention, credit, financial, insurance, security clearance or permissible access, or other business or government decisions based on the verified and authenticated information. Moreover, the system allows consumers, applicants, employees, or individuals to provide detailed reasons why they should be granted credit, employment, continued employment, security access or clearance, insurance, medical benefits, contractor status, or other benefits despite adverse or derogatory information found in the report. The business process creates a cost effective and efficient method that saves time, expense, misidentification or reliance on erroneous information that are not the individuals' records due to similarities in names or other personal identifying information, such as social security numbers, residential addresses, dates of birth, and other information commonly used to match records or data to individuals. The process further mitigates damages by reporting or using inaccurate information about consumers through open and transparent reporting of the information to the individual in a timely, if not instant manner.

Figure 1:
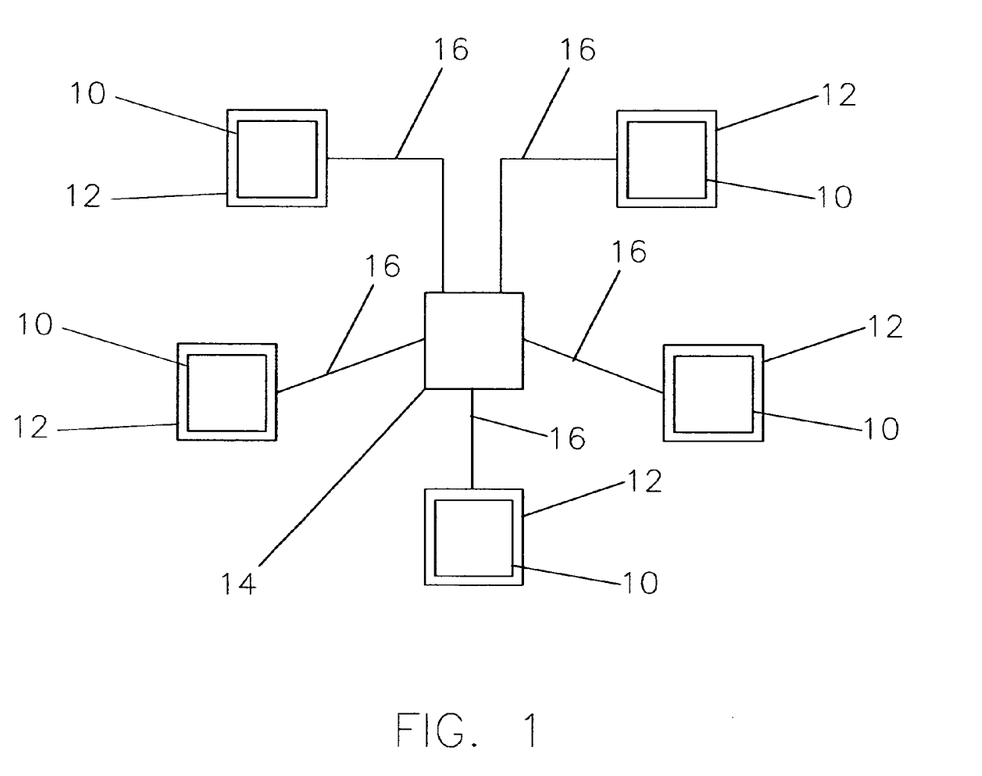
FIG. 1 depicts the authorization by a subject to use the invention to authenticate the accuracy and provide additional information when the consumer report contains negative or derogatory information.

Consumer complaints, litigation, and frustration over the use, abuse, or unauthorized use of reports containing inaccurate information heretofore described left consumers to rely on the limited and restrictive remedies afforded by the FCRA and other federal and state laws. The FCRA process gives CRAs up to 30 days to reinvestigate disputed inaccuracies. This delay often damages the consumer or subject, as the job, clearance, credit, insurance, or other benefit are retracted or offered to another consumer or individual that does not require a reinvestigation of the original report. The preferred embodiment of the present invention can be implemented through the use of the Internet, hand delivery, email, facsimile, securely online, mail, overnight express, courier, or other delivery methods (hereinafter "delivery systems") wherein the individual or consumer using FIG. 1, or similar printed or online form, agrees to use the invention to review his or her report contemporaneous to the user of the report for inaccuracies and ability to report information to possibly explain negative or derogatory information contained therein. The invention creates fairness for consumers to view and comment on his or her report before adverse action or final decisions are taken by the user thereby mitigating or eliminating future claims of damages heretofore insoluble in this manner.

Figure 2:
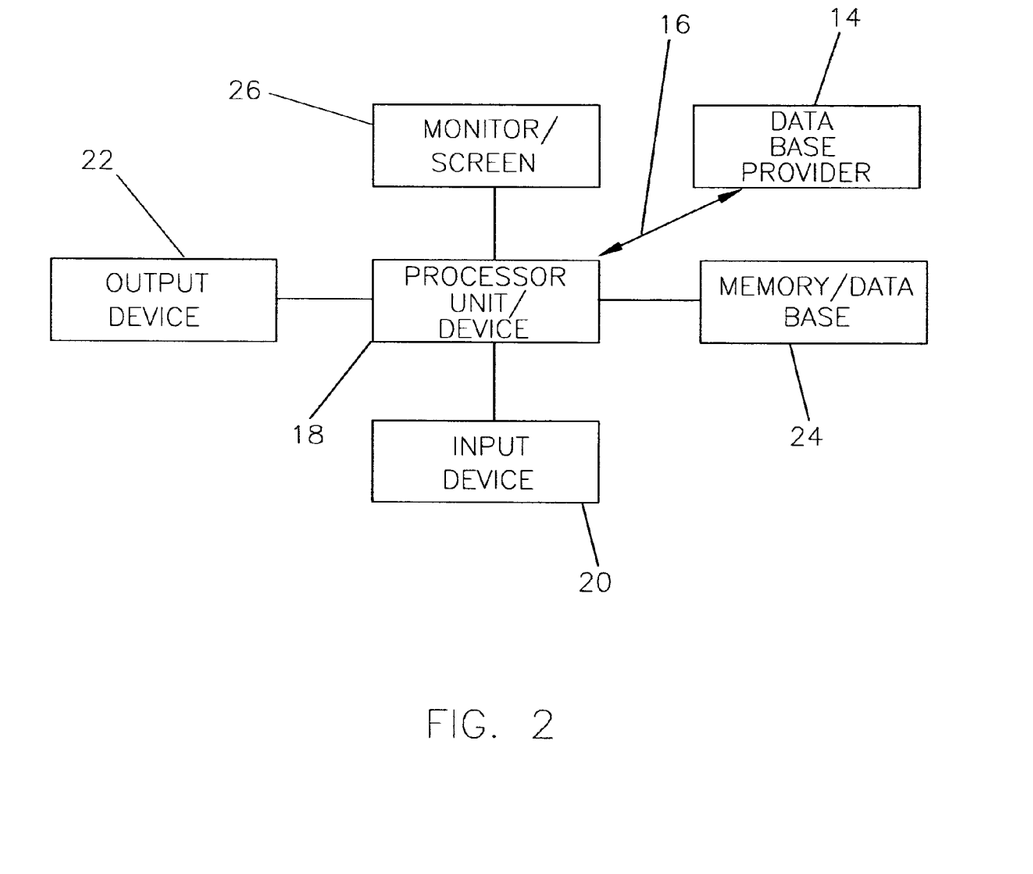
FIG. 2 depicts a consumer report and the authentication questionnaire using the method and system of the present invention transmitted to the consumer and user.
Figure 3:
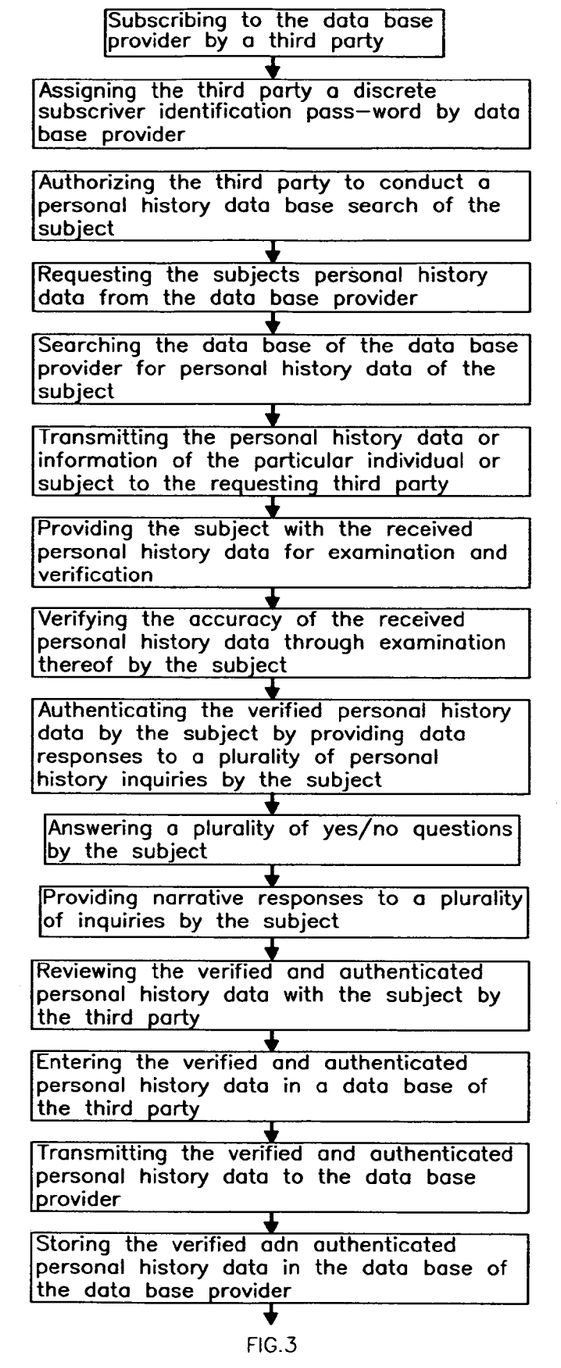
FIG. 3 depicts an alert report to the user to take no adverse action against the consumer pending completion of the re-investigation of the consumer report.
Figure 4:
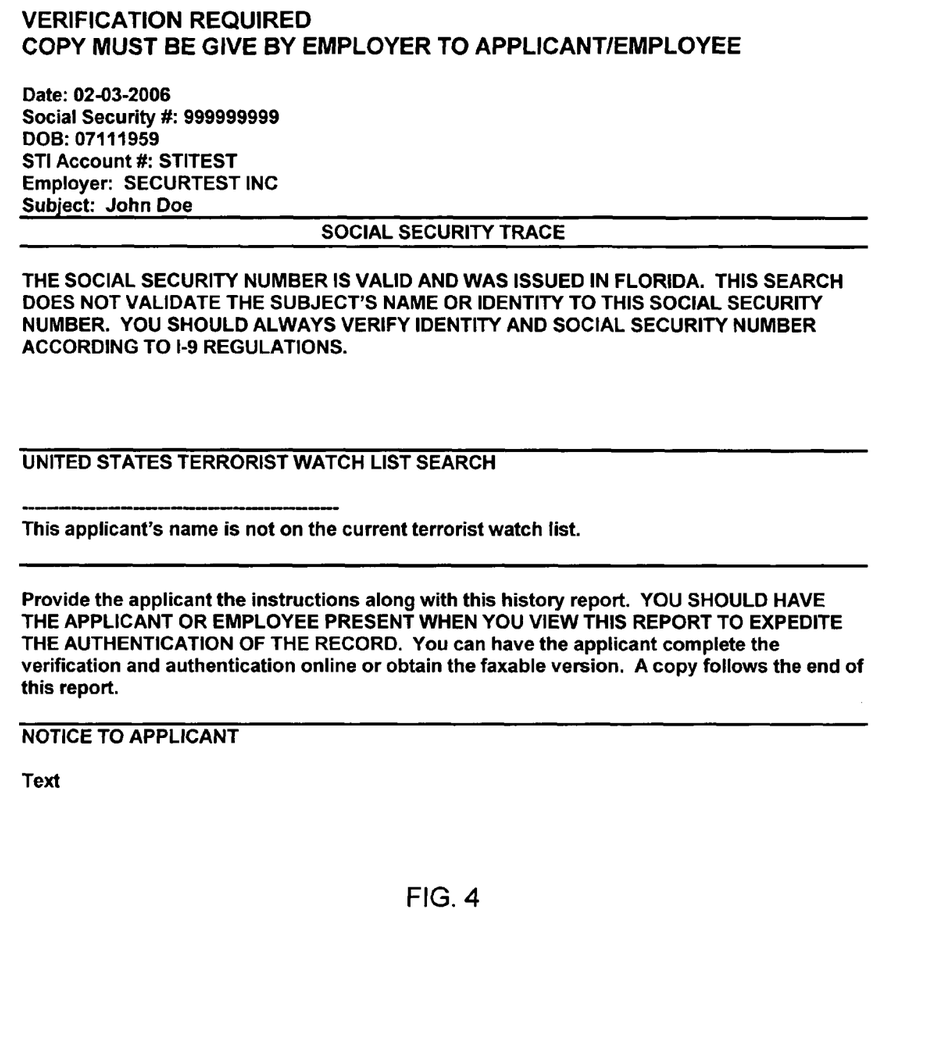
FIG. 4 depicts a completed authentication re-investigation report.

The method of the present invention is best understood with reference to FIG. 2. Specifically, the method and system transmits by the preferred or elected "delivery system" the consumer report or record to the consumer and user as exampled in FIG. 2. FIG. 2 shows a typical background report from pages 1 to 6. The invention includes on page 1 of FIG. 2 the identified language, "VERIFICATION REQUIRED" and "CONSUMER MUST COMPLETE AND RETURN THE iReviewNow QUESTIONNAIRE", or similar alerts and warnings heretofore not found in such reports. The invention also includes language as found on page 7 of FIG. 2, which provides unique instructions for users and individuals to complete the unique verification questionnaire system found on pages 8 to 11. The individual or consumer using the preferred or elected delivery system transmits his or her responses to the questionnaire found in FIG. 2 to the user or entity creating or using the report. Wherein the report contains no adverse, derogatory, or other information that might adversely affect the individual, the content of pages 8 to 11 and the warnings, alerts or instructions found on pages 1 and 7 are not incorporated in the consumer report. Wherein the report contains adverse, derogatory or other information that might negatively affect the consumer, the subject completes a questionnaire system and returns his or her responses by the preferred or elected delivery system to the user and entity reporting the adverse or derogatory information. Thereafter, a "stop alert" or "pending status" notification is transmitted to the user, CRA, and/or entity reporting the adverse information as found in FIG. 3, or by similar language. These entities or CRAs are instructed to begin an immediate reinvestigation of disputed information found in the report, as identified by the consumer or individual. The reinvestigation is thus expedited and mitigates the consumer or individual's frustration as he or she becomes part of the verification and background investigation system. Once the reinvestigation is completed, a reinvestigation report, such as found in FIG. 4, is transmitted using the preferred or elected delivery system to the user, consumer, or entities as described herein. Information is removed from the background screening or CRA providers of the adverse information when found to be inaccurate or not the record of the subject in question with a new report transmitted to the user and consumer.

Figure 5:
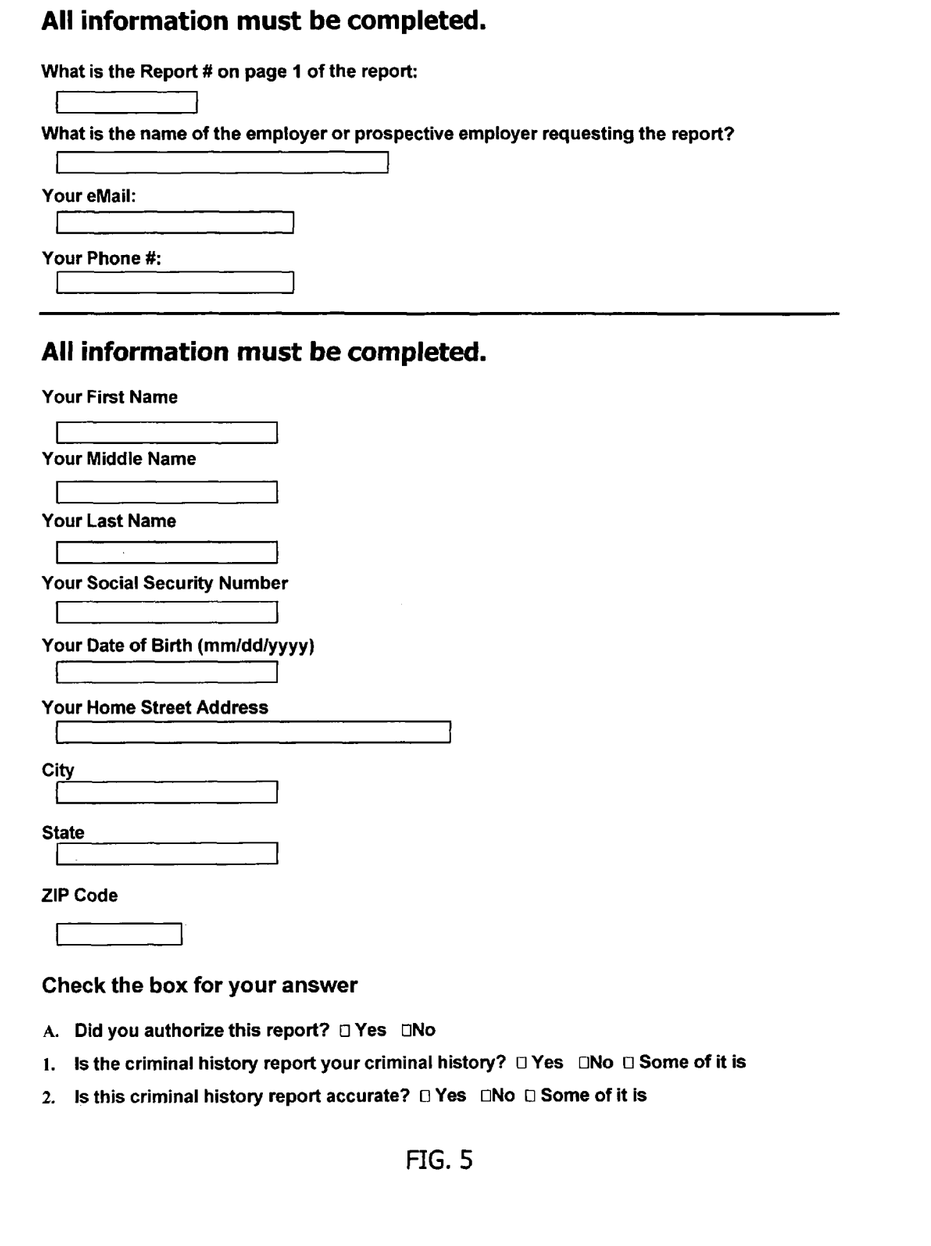
FIG. 5 depicts the types of authenticating questions based on the types of consumer reports.

FIG. 5 shows examples of questionnaires and questions used to authenticate the consumer record, verify the accuracy of the report, identify discrepancies or inaccuracies, and allow the individual or consumer to help verify or correct the report and explain potentially damaging or derogatory information.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

Now that the invention has been described,

What is claimed is:

1. A computer-implemented method for retrieving and storing personal history that is collected from a subject of a search after the search is conducted, the search being ordered by a third party, comprising the steps of:

providing a database comprising background information about a plurality of individuals in which the background information has not been checked by any of the individuals and in which access to the database by any of the individuals is restricted and information therein cannot be pre-screened and accessed by one or more of the individuals;

transmitting one or more passwords over a computer network to only a third party who is a subscriber of the database;

receiving the one or more passwords from a computer network from the third party;

providing the third party access to the database;

receiving a search request for background information about a subject, the subject comprising a person of interest from the plurality of individuals in the database;

transmitting data comprising background information about the subject over the computer network to the third party;

after transmitting the data comprising the background information about the subject, then transmitting identical background information about the subject over the computer network to the person of interest;

displaying the background information about the subject to the person of interest on a display device;

displaying a plurality of fields on a display device that prompt the person of interest to enter personal information;

receiving personal information in the fields from the person of interest;

displaying a plurality of YES and NO questions related to the background information about the subject on the display device that prompt the person of interest to answer the YES and NO questions;

receiving at least one of YES and NO answers from the person of interest corresponding to the YES and NO questions;

transmitting the personal information with the YES and NO answers over the computer network to the database;

associating the personal information and YES and NO answers with the background information about the subject; and storing the personal information and YES and NO answers in the database as an appendix to the information about the subject, the personal information with the YES and NO answers providing context for the third party such that any adverse or derogatory data in the background information about the person of interest is mitigated; and displaying the background information with the appendix to the third party.

2. The computer-implemented method of claim 1, further comprising displaying at least one field for entering narrative data on the display device.

3. The computer-implemented method of claim 2, further comprising receiving narrative data corresponding to the at least one field.

4. The computer-implemented method of claim 3, further comprising: transmitting the narrative data with the personal data and YES and NO answers over the computer network to the database.

5. The computer-implemented method of claim 4, further comprising: associating the narrative data with the background information about the subject.

6. The computer-implemented method of claim 5, further comprising: storing the narrative data in the database along with the personal data and YES and NO answers as the appendix to the background information about the subject, the personal information, YES and NO answers, and narrative data providing context for the third party such that any adverse or derogatory data in the background information about the person of interest is mitigated.

7. The computer-implemented method of claim 1, wherein the background information stored in the database comprises at least one of credit report data, public background reports, private background reports, current employment data, past employment data, and criminal background data.

8. The computer-implemented method of claim 1, wherein the personal information comprises at least one of a first name of the person of interest, a last name of the person of interest, a social security number of the person of interest, a birth date of the person of interest, a street address of the person of interest, a city of residence for the person of interest, a state of residence for the person of interest, and a zip code.

9. The computer-implemented method of claim 1, wherein the YES and NO questions comprise at least one of a question asking whether the search request was authorized by the person of interest, a question asking if any criminal history report in the background information about the person of interest is correct, a question asking whether the person of interest has been convicted of any crime, a question asking whether the person of interest has been convicted of a misdemeanor, a question asking whether the person of interest has been convicted of a felony, and a question asking whether the person of interest is on parole.

10. The computer implemented method of claim 1, further comprising displaying text adjacent to the at least one field for entering narrative data on a display device, the text requesting at least one of: the person of interest to explain why an employer should hire the person of interest despite any relevant criminal history of the person of interest, the person of interest to explain which records in the background information are not the person of interest's information, and a typed signature from the person of interest.

11. A computer system for retrieving and storing personal history that is collected from a subject of a search after the search is conducted, the search being ordered by a third party, the system comprising:

a microprocessor operable to:

provide a database comprising background information about a plurality of individuals in which the background information has not been checked by any of the individuals and in which access to the database by any of the individuals is restricted and information therein cannot be pre-screened and accessed by one or more of the individuals;

transmit one or more passwords over a computer network to only a third party who is a subscriber of the database;

receive the one or more passwords from a computer network from the third party;

provide the third party access to the database;

receive a search request for background information about a subject, the subject comprising a person of interest from the plurality of individuals in the database;

transmit data comprising background information about the subject over the computer network to the third party;

after the data comprising the background information about the subject is transmitted, then transmit identical background information about the subject over the computer network to the person of interest;

display the background information about the subject to the person of interest on a display device;

display a plurality of fields on a display device that prompt the person of interest to enter personal information;

receive personal information in the fields from the person of interest;

display a plurality of YES and NO questions related to the background information about the subject on the display device that prompt the person of interest to answer the YES and NO questions;

receive at least one of YES and NO answers from the person of interest corresponding to the YES and NO questions;

transmit the personal information with the YES and NO answers over the computer network to the database;

associate the personal information and YES and NO answers with the background information about the subject;

store the personal information and YES and NO answers in the database as an appendix to the information about the subject, the personal information with the YES and NO answers providing context for the third party such that any adverse or derogatory data in the background information about the person of interest is mitigated; and display the background information with the appendix to the third party.

12. The computer system of claim 11, wherein the microprocessor is further operable to display at least one field for entering narrative data on a display device.

13. The computer system of claim 12, wherein the microprocessor is further operable to receive narrative data corresponding to the at least one field.

14. The computer system of claim 13, wherein the microprocessor is further operable to transmit the narrative data with the personal data and YES and NO answers over the computer network to the database.

15. The computer system of claim 14, wherein the microprocessor is further operable to associate the narrative data with the background information about the person of interest.

16. The computer system of claim 15, wherein the microprocessor is further operable to store the narrative data in the database along with the personal data and YES and NO answers as the appendix to the background information about the person of interest, the personal information, YES and NO answers, and narrative data providing context for the third party such that any adverse or derogatory data in the background information about the person of interest is mitigated.

17. The computer system of claim 11, wherein the background information stored in the database comprises at least one of credit report data, public background reports, private background reports, current employment data, past employment data, and criminal background data.

18. The computer system of claim 11, wherein the personal information comprises at least one of a first name of the person of interest, a last name of the person of interest, a social security number of the person of interest, a birth date of the person of interest, a street address of the person of interest, a city of residence for the person of interest, a state of residence for the person of interest, and a zip code.

19. The computer system of claim 11, wherein the YES and NO questions comprise at least one of a question asking whether the search request was authorized by the person of interest, a question asking if any criminal history report in the background information about the person of interest is correct, a question asking whether the person of interest has been convicted of any crime, a question asking whether the person of interest has been convicted of a misdemeanor, a question asking whether the person of interest has been convicted of a felony, and a question asking whether the person of interest is on parole.

20. The computer system of claim 11, wherein the microprocessor is further operable to display text adjacent to the at least one field for entering narrative data on a display device, the text requesting at least one of: the person of interest to explain why an employer should hire the subject despite any relevant criminal history of the person of interest, the person of interest to explain which records in the background information are not the person of interest's information, and a typed signature from the person of interest.

* * * * *